Oct. 11, 1960 D. L. SMITH 2,956,141

ELECTRICAL CIRCUIT CONNECTOR APPARATUS

Filed Dec. 30, 1957

INVENTOR.
DONALD L. SMITH

BY

Dewey J Cunningham
ATTORNEY 2,956,141

ELECTRICAL CIRCUIT CONNECTOR APPARATUS

Donald L. Smith, Apalachin, N.Y., assignor to International Business Machines Corporation, New York, N.Y., a corporation of New York Filed Dec. 30, 1957, Ser. No. 706,035

2 Claims. (Cl. 200—166)

The present invention relates to an electrical circuit assembly of the type having a plurality of spaced-apart members supporting electrical circuitry, and more particularly to connector apparatus which may be selectively used to make desired connections between the circuitry on the members.

With the emphasis on obtaining maximum compactness in an electronic circuit assembly, the trend in circuit packaging has been away from the single layer chassis in which certain components are mounted on opposite sides thereof. Instead, the size of the chassis has been reduced for a given circuit assembly and several members are used in spaced-apart, stacked relation for supporting the various electrical components and interconnecting wiring. With the new trend came the more difficult task of obtaining electrical interconnection between the circuitry on the various members. This is particularly true where an effort is made to space the members a minimum distance apart to obtain greater compactness.

While a small volume package is obtained with a stacked array of circuit members such as described above, considerable difficulty is encountered in an effort to service the assembly. One practice is to discard the entire assembly as it may be less expensive to build an entirely new assembly rather than disconnect several layers, make the proper repairs, and then reconnect them. While the throw-away philosophy may be more economical in certain instances, it is nonetheless a waste of equipment which should preferably be avoided.

Furthermore, in the construction of such circuit assemblies for experimental purposes, it is desirable to be able to make connections which may be made permanent and others which are less permanent. It may even be desirable to break the permanent connections for a time and then make the connections over again. All of this should be capable of accomplishment with a minimum of effort and time.

The present invention is similar to prior art devices in that it relates to an electrical assembly of the multi-layered type so as to have a minimum volume, but contrasts with such prior art structures in the manner in which the electrical connections between the layers are made. Briefly, there is provided a plurality of generally U-shaped connectors which are adapted to be received by a spacer member between adjacent circuit supporting members. The spacer member is positioned inwardly of a selected edge of said circuit supporting members. The base of each U-shaped connector is adapted to fit within the spacer member with the legs projecting outwardly therefrom beyond said spacer member toward said selected edge. Each leg is bent in a fashion to form a contact point which is adapted to be normally biased against a conductor on the circuit supporting member adjacent thereto. In order to provide for situations where it is not desired to connect the circuits on adjacent boards together, turned-in portions on the free ends of the legs of each connector may be latched together to prevent the contact points on the legs from making the interconnection between the conductors on adjacent boards. At the same time, the base of the connector is lengthened slightly, by virtue of the free ends being latched, so that a tighter fit of the base in the spacer is afforded. Thus, the connector will remain in the spacer for possible future use.

Accordingly, it is an object of the present invention to provide a new and improved arrangement for interconnecting the electrical circuitry on the different members of a three-dimensional circuit assembly.

It is an object of the present invention to provide a new and improved arrangement for electrically interconnecting two or more electrical circuit supporting members.

Still another object of this invention is to furnish a new and improved means for mounting complex electronic circuitry in an interconnected layer-like fashion whereby the layers may be placed in close proximity in order to obtain a minimum volume circuit package, or may be disconnected and a layer removed for maximum accessibility to the circuitry for servicing.

Still another object of the invention is to provide a flexible means of connection, as described above, for both experimental and production models of complex electronic circuitry.

Another object of this invention is to provide a flexible connector, as described above, wherein the connector is not required to be fixedly secured to the assembly and wherein the connection or disconnection of circuit conductors on adjacent boards may be simply made.

Other objects of the invention will be pointed out in the following description and claims and illustrated in the accompanying drawings, which disclose, by way of examples, the principles of the invention and the best mode which has been contemplated of applying that principle.

Figure 1:
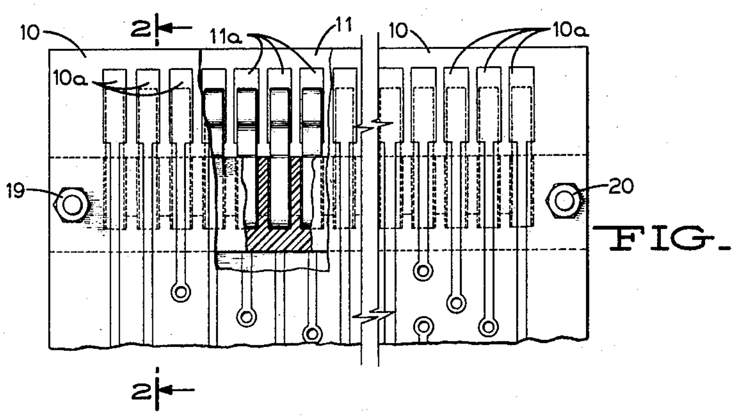
Fig. 1 is a plan view of the present invention with a portion thereof broken away to show the manner in which a plurality of circuit connectors are mounted on the circuit boards.
Figure 2:
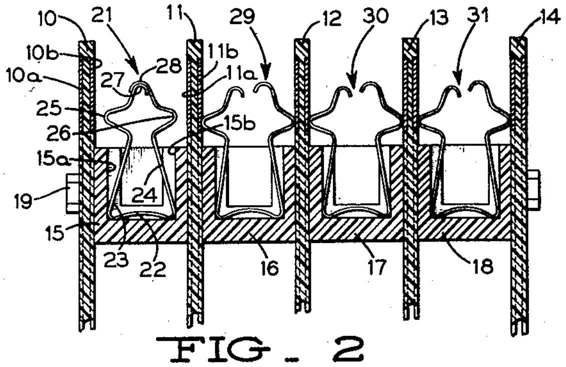
Fig. 2 is a sectional view taken on lines 2—2 of Fig. 1.
Figure 3:
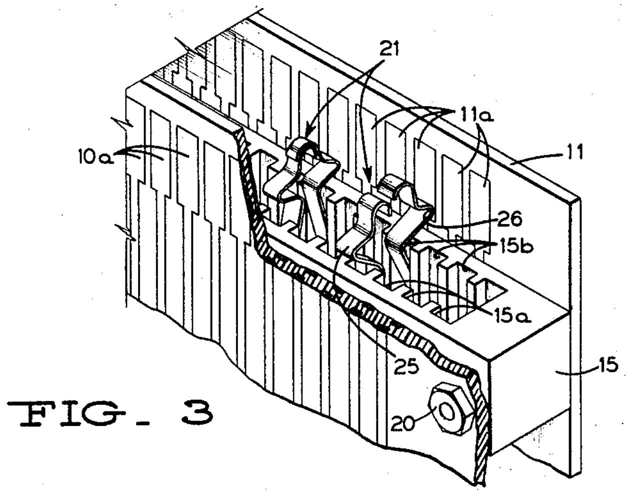
Fig. 3 is a partial isometric view of the present invention.

Referring to Figs. 1 through 3, there is shown a plurality of circuit-supporting members which are provided with reference numerals 10 through 14. These members are normally constructed of an insulating material and may be referred to as circuit boards. They are adapted to have metallized conductors thereon which may be produced in any suitable fashion. For example, as seen in Fig. 1 the circuit supporting member 10 is provided with a plurality of conductors identified by reference numeral 10*a*. It will be understood from Fig. 2 that a plurality of conductors 10*b* are provided on the opposite side of the circuit supporting member 10. The conductors 10*b* are similar to conductors 10*a* but do not necessarily extend to the same points on member 10 unless it is desired to make a connection through the circuit supporting member at a particular point. It will be appreciated that the specific conductor patterns on the circuit supporting member will be dependent upon the details of the circuit being implemented.

As illustrated, each of the above-referenced conductors has an enlarged area adjacent the upper edge of the circuit-supporting member, the enlarged areas of the conductors being arranged in a row in spaced-apart relation along said edge. These enlarged areas are adapted to be connected by way of suitable conductors to the various circuit components (not shown ) which are to be mounted on member 10. Circuit-supporting member 11 is provided in a similar fashion with conductors **11*a* and 11*b* on opposite sides thereof. It will also be understood that circuit-supporting members 12, 13 and 14** may be similarly provided with conductors on the opposite sides thereof.

In order to maintain boards 10 through 14 in spaced relation, spacers 15 through 18 are furnished. The boards and spacers are adapted to be held together by suitable rods 19 and 20.

As shown in Fig. 3, the spacer 15, which is identical with the remaining spacers, is provided with a plurality of pockets having the side walls **15*a* and 15*b* on opposite sides of the spacer. These pockets are each adapted to receive one of the generally U-shaped resilient connectors 21. Inasmuch as each connector is identical, a description of one is deemed sufficient. The connector is adapted to be constructed of resilient conductive material and is provided with a slightly bowed base portion 22 having legs 23 and 24 extending upwardly therefrom. After the legs 23 and 24 emerge from the spacer they are bent in a fashion to respectively provide the contact points 25 and 26. The free ends of legs 23 and 24 are provided respectively with the turned-in portions 27 and 28 which, in the position shown in Fig. 2, are adapted to fit together in complementary fashion. This is a position whereby no connection is made by the connector between conductor 10*b* on board 10 and conductor 11*a* on board 11. However, if such a connection is desired, it is but necessary to disengage the turned-in portions 27 and 28. The legs are spring-biased to swing outwardly away from each other until contact points 25 and 26 respectively engage conductors 10*b* and 11*a*. Connectors 29, 30 and 31 are shown in this condition to respectively provide connections between the conductors on boards 11 and 12, 12 and 13, and 13 and 14**.

An examination of Fig. 2 will reveal that the base of the connector 21 is not bowed as much as the base of each of the connectors 29, 30 and 31. This is due to the fact that when legs 23 and 24 are brought close together so that the turned-in portions 27 and 28 may be latched together, the connection of the base to the legs is sufficiently rigid that primarily only the center portion of the base flexes. When this occurs, the overall length of the base increases and the joining thereof with the legs bears against the spacer sides **15*a* and 15*b* and retains the connector within the spacer. On the other hand, when the turned-in portions 27 and 28 are disengaged so that the contact points 25 and 26 are in engagement with conductors 10*b* and 11*a***, respectively, the bearing pressure of the contact points on the conductors causes the connector to remain in position in the spacer.

Once all of the desired connections are made in an entire assembly, testing may be carried out and then the entire assembly may be dip soldered so that at those points where a contact point is to make electrical contact with an adjacent pair of conductors, a rigid connection will be made. If it should be desired to unsolder the connections it is merely necessary that some form of gripping mechanism, capable of being heated, be placed against the legs such that the legs will be urged toward each other. The heat will melt the solder and thereafter the turned-in portions may be latched together.

From the above detailed description it will be apparent that I have provided a new and improved connector for interconnecting the electrical circuitry on the different members of a three-dimensional circuit assembly. The circuits may be as complex as desired and yet provide an arrangement whereby a minimum volume circuit is required. Selective connections may be made between conductors on the different circuit supporting members and they may be broken in a simple fashion if accessibility is desired or if a particular circuit should be broken.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for interconnecting the electrical circuitry on a plurality of spaced-apart circuit-supporting members, mounting means between a pair of said members along a selected edge thereof, said mounting means having a plurality of pockets therein which open outwardly toward said selected edge, said pockets having a plurality of generally U-shaped resilient connectors therein constructed of a conductive material, the base of each connector being adapted to fit in one of said pockets with the legs of said connector extending outwardly toward said selected edge, each of said legs having a contact point thereon, said contact points being adapted to engage conductors on said pair of members to establish an electrical connection therebetween, and means on the free ends of said legs for latching them together so as to prevent the contact points from engaging their associated conductors, the base of each connector being curved such that the latching together of the free ends of said legs causes said base to increase in length and bear against the sides of the pocket to prevent the connector from leaving the pocket when the legs are latched.

2. Apparatus for interconnecting the electrical circuitry on a plurality of spaced apart circuit supporting members, spacer means between a pair of said members along a selected edge thereof, said spacer means having a plurality of pockets therein which open outwardly toward said selected edge, said pockets having a plurality of generally U-shaped resilient connectors therein constructed of a conductive material, the base of each connector being adapted to fit in one of said pockets with the legs of said connector extending outwardly toward said selected edge, each of said legs having a contact point thereon, the contact point on one of said legs being adapted to make contact with a conductor on the circuit supporting member on one side of said spacer means and the contact point on the other leg being adapted to make contact with a conductor on the circuit supporting member on the other side of said spacer means, and means on the free ends of said legs for latching them together so as to prevent the contact points from engaging their associated conductors.

References Cited in the file of this patent

UNITED STATES PATENTS

| | | |
|---|---|---|
| 2,701,866 | Chapman | Feb. 8, 1955 |
| 2,772,332 | Carlson | Nov. 27, 1956 |

FOREIGN PATENTS

| | | |
|---|---|---|
| 684,579 | Great Britain | Dec. 17, 1952 |

OTHER REFERENCES

Buggie: EC Catalog, page 6, 1954.